June 29, 1948.  J. G. BOOTH  2,444,329
INTEGRATOR
Filed Oct. 18, 1944  2 Sheets-Sheet 1
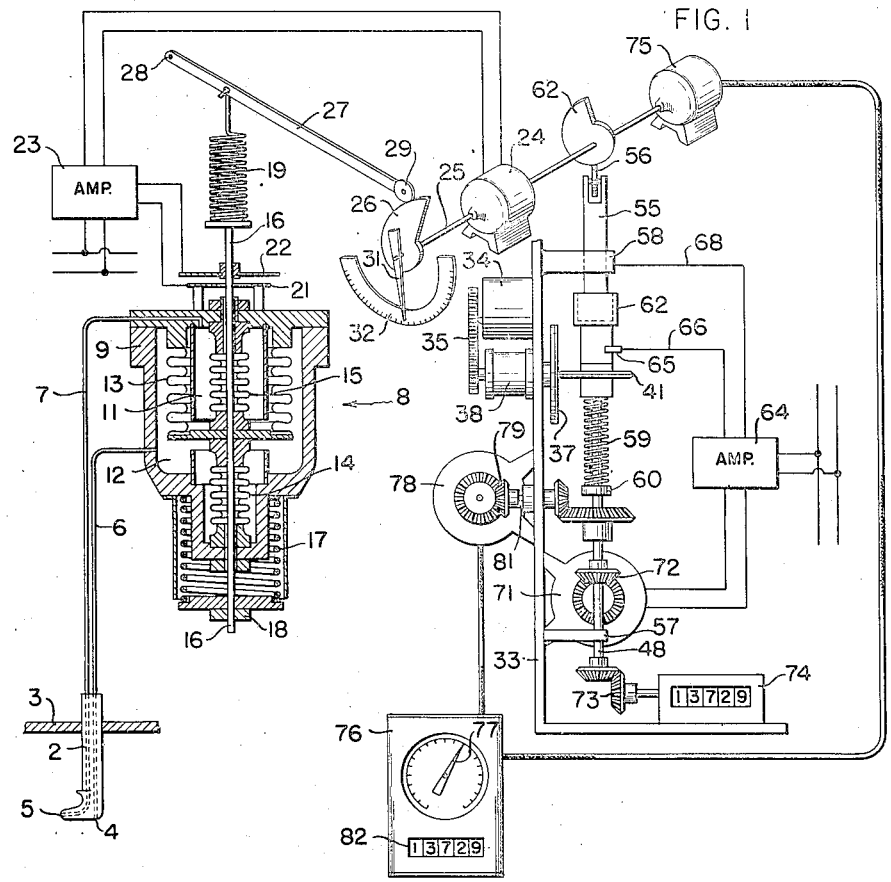
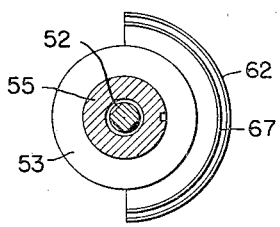
FIG. 3
INVENTOR.
JOHN G. BOOTH
BY
ATTORNEY.

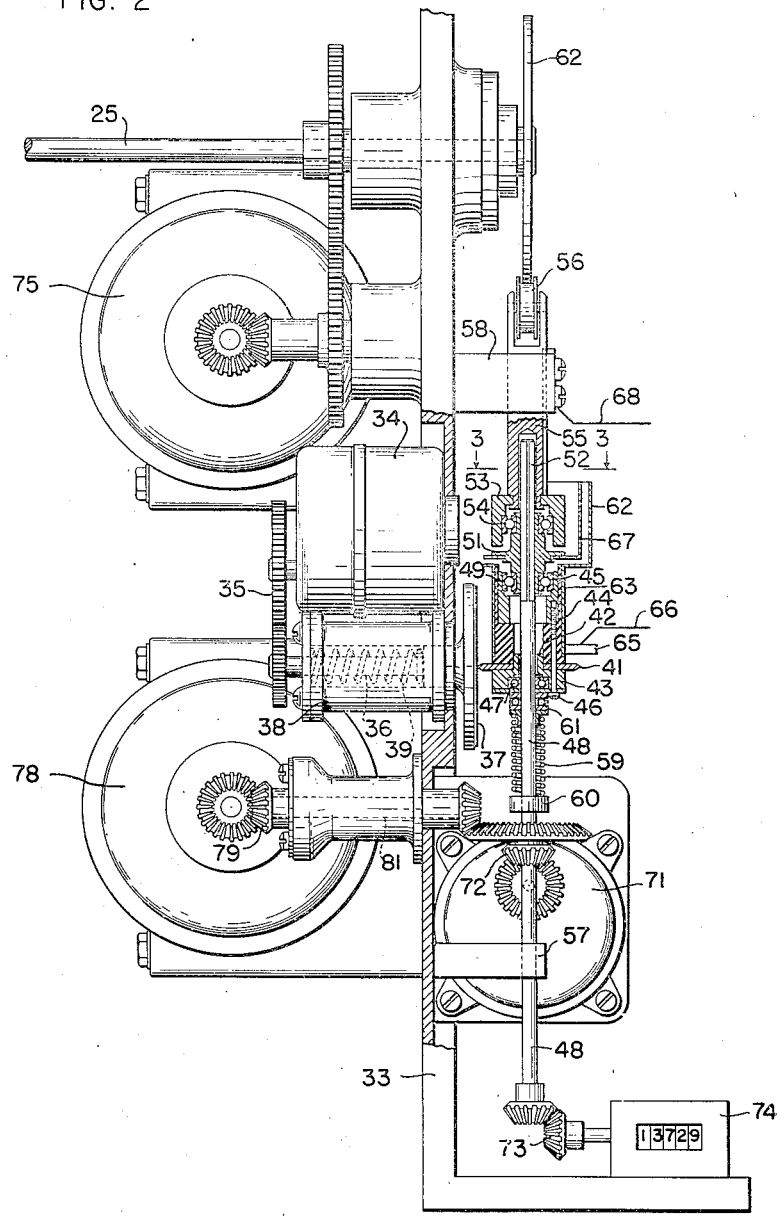

Patented June 29, 1948

2,444,329

UNITED STATES PATENT OFFICE 2,444,329

INTEGRATOR

John G. Booth, Philadelphia, Pa., assignor to The Brown Instrument Company, Philadelphia, Pa., a corporation of Pennsylvania Application October 18, 1944, Serial No. 559,153

2 Claims. (Cl. 235—61)

The present invention relates to integrating mechanisms, and more particularly, to integrators that are used in ship log systems to accurately totalize the number of miles traversed by the ship upon which the instrument is mounted.

In the navigation of ships it is necessary to have some accurate way of computing the number of miles traversed by the ship. This is particularly true when the ship's position is computed by dead reckoning. In most modern ship log systems the speed of the ship is measured by the use of a Pitot tube, the static and dynamic pressures of which are impressed upon a differential pressure measuring element. By extracting the square root of this differential pressure, a linear record of the speed may be obtained. From this record, taken with the time the ship is under way, the total miles traveled may easily be obtained.

Most integrators in use today are intermittent in operation or of the continuous type using a friction drive between a driving disk rotated at a constant speed and a driven disk moved thereacross to positions dependent upon ship speed. The driven disc then directly operates a suitable counter. The intermittent type integrator is not satisfactory because it gives only an average record of distance traveled. It measures the speed periodically and adds these measurements. The disc type continuous integrator is satisfactory in principle inasmuch as it gives a continuous integration of the ship's speed, but in practice it requires a large amount of power to be transmitted through a delicate friction drive. The drive is therefore subject to quite a bit of slipping so that the reading obtained is not accurate. This is particularly true when, in addition to driving a counter, the instrument is also used to drive a telemetering system so that an indication of the number of miles traveled by the ship may be transmitted to several repeater stations on the ship.

It is an object of the invention to produce an integrator for use with a ship log system that is simple in operation and highly accurate. In this integrator there is provided a friction driving disc that is rotated at a constant speed which serves to rotate a driven disc mounted perpendicular thereto. The driven disc is moved radially of the driving disc in proportion to the ship's speed, and is therefore rotated at a speed proportional thereto. The driven disc rotates one element of a capacitance type torque amplifier the other element of which is rotated by a follow up motor at a speed exactly equal to that of the driven disc. The follow-up motor then serves to drive a counter and the transmitting element of a telemetering system.

A further object of the invention is to provide a continuous type integrator in which a torque amplifier is used so that the driven disc thereof has practically no load to move. The fact that the driven member has no load on it means that there will be no slipping between this member and the driving member, consequently the integrated variable will be accurate.

It is a further object of the invention to produce an integrating mechanism that may be used in any place where a highly accurate device of this kind is needed.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

In the drawings:

Fig. 1 is a schematic view of the entire integrating system;

Fig. 2 is a view, partly in section, of the mechanism of the integrator; and

Fig. 3 is a view taken on line 3—3 of Fig. 2.

Referring first to Fig. 1, there is shown a Pitot tube or rod meter 2 which projects through the hull 3 of a ship into the water. The tube is provided with a static opening 4 and a dynamic opening 5 that are connected by tubes 6 and 7 respectively with a differential pressure unit 8.

As shown herein, the differential pressure unit 8 consists of a casing 9 that is divided into a high pressure chamber 11 and a low pressure chamber 12 by a bellows 13. Sealing bellows 14 and 15 are placed in the chambers so that a position transmitting rod 16 which is attached to the end of bellows 13 may extend on both ends beyond the casing. The tube 6 is connected with chamber 12 and the tube 7 is connected with the chamber 11. Therefore as the ship moves through the water with the Pitot tube moving to the left in Fig. 1, a differential pressure will be created to expand bellows 13 as the ship's speed increases. The speed of the ship will vary substantially in accordance with the square root of the differential pressure.

The bellows 13 is put under an initial tension by a spring 17 that bears with one end against the casing 9 and with its other end against a nut 18 that is threaded on the shaft 16. The zero point of the device may be varied by adjusting the nut 18 along the rod 16. The force of the pressure differential and spring 17 is opposed by a spring 19 attached to the upper end of rod 16. The strength of spring 19 is varied depending upon the range of differential pressure through which the instrument is to operate. The force of spring 19 is varied as the differential pressure across the bellows 13 varies due to speed changes in order to maintain the end of the bellows 13 in a substantially fixed position. This is accomplished in the following fashion.

Movement of the rod 16 acts through a variable capacitance follow-up system to energize an electric motor for rotation in one direction or the other. This motor acts through a cam and lever system to shift the rod 16 back to its original position. To this end one plate 21 of a variable condenser is rigidly attached to the casing 9 while the other plate 22 is mounted for movement with the rod 16 but is electrically insulated therefrom. The condenser plates are electrically connected to a capacitance follow-up and amplifier unit 23 preferably of the type disclosed in the application of Rudolf Wild, Serial Number 537,505, filed on May 26, 1944, although one similar to that shown in Moseley 2,126,910 may be used. This unit serves to energize an electric motor 24, the shaft 25 of which has a square root cam 26 on it. As the cam rotates it moves a lever 27 around its pivot 28. The lever is provided with a cam roller 29 to bear on cam 26 and has the upper end of spring 19 fastened to it intermediate the roller and the pivot.

In operation, as the speed of the ship varies, the differential pressure across the bellows 13 is varied to shift condenser plate 22 relative to the condenser plate 21. The unit 23 detects the variation in capacity of the condenser formed of plates 22 and 21 and energizes motor 24 for rotation in a direction dependent upon whether the capacity has increased or decreased. The motor acting through cam 26 and lever 27 either elongates the spring 19 or permits it to contract, thereby varying the force of the spring so that the bellows 13 will be returned to its original length. The condenser plate 22 is accordingly moved back to its original and normal position and motor 23 is stopped. Since the cam 26 is shaped to extract the square root of the pressure head, the shaft 25 is rotated linearly with respect to the speed of the ship. Consequently a pointer 31 attached to shaft 25 may move across a linear scale 32 to indicate speel in knots or nautical miles per hour.

The various elements used for integrating or totalizing the distance traversed by the ship are shown schematically in Fig. 1 and in detail in Fig. 2 and Fig. 3. Referring to the latter figures there is shown a supporting plate 33 upon which the various parts are mounted. This plate may also serve to support the above described parts if desired.

There is mounted on the left face of plate 33 a motor means 34 that may be either mechanical or electrical just so long as it has an extremely constant speed. This motor, through gearing 35, rotates a shaft 36 that has a polished, flat disc 37 upon its opposite end. The shaft is mounted in a bearing member 38 in such a manner that the disc is on the right side of the supporting plate. The shaft 36 is constantly biased to the right by a spring 39 with a suitable force. To this end shaft 36 is formed with a shoulder against which one end of the spring bears, the other end pressing against a suitable shoulder in the bearing member.

Rotation of disc 37 is used to rotate a second driven disc 41 at variable speeds depending upon the radial distance of disc 41 from the center of disc 37. To this end the disc 41 is mounted for both rotating and sliding movement. As shown in Fig. 2 the disc 41 is mounted on a reduced portion 42 of a cylindrical member 43. Also mounted on 42 is one end of a cylindrical member 44 that is made of some suitable insulating material. The cylindrical member 44 is counterbored in its opposite end to receive a bearing part 45. Parts 41 to 45 are held together in a rigid assembly by suitable bolts 46. The member 43 is provided with a ball bearing 47, the inner race of which is slidably received by a shaft 48. Part 45 is provided with a ball bearing 49, the inner race of which is mounted on a condenser plate supporting member 51 that is in turn slidably mounted on the squared end 52 of shaft 48. As shown, the upper end of member 51 is centered in a non-rotatable cup 53 by another ball bearing 54. The cup 53 is fastened to the lower end of a rod 55 that has a cam following roller 56 on it. The entire assembly is aligned on plate 33 by a bearing 57 that supports the rod 48 and a bearing 58 that supports the upper rod 55.

In the operation of this portion of the device, the disc 41 and its associated parts are normally biased upwardly by a spring 59. This spring bears with its lower end against a collar 60 on the shaft 48 and with its upper end against a thrust bearing 61 slidably mounted on shaft 48 and acting against the lower end of member 43. The disc 41 and its associated parts are moved downwardly by the action of a cam 62 on the roller 56. This cam is fixed to the end of shaft 25 so that it is rotated in proportion to the ship's speed. Therefore the position of disc 41 radially of disc 37, and consequently the speed of rotation of disc 41 is directly proportional to the speed of the ship.

To transfer the rotation of disc 41 into the useful motion of actuating an integrating counter a variable capacitance follow-up or torque amplifying system is used, which system is similar to that previously described. The primary or leading condenser plate of the capacitance follow-up system takes the form of a semi-cylindrical member 62, as best shown in Fig. 3. The plate 62 is attached to a cylindrical sleeve 63 that fits over the insulating member 44. Plate 62 is therefore completely insulated from the rest of the apparatus. To connect the plate 62 to a capacitance follow-up and amplifier unit 64, which may also be of a type disclosed in the said Wild application, Serial Number 537,505, there is provided a brush 65 which bears against the surface of sleeve 63 and is connected to the amplifier by a wire 66.

The second plate 67 of the variable condenser is also shown as being a semi-cylindrical member. This plate is attached to the rotating support 51. Since the condenser plate is grounded it may be connected to the amplifier unit 64 by a wire 68 attached to any convenient point such as the bearing 58.

It will be seen that the parts rotated by disc 41 are very light and are mounted on bearings to roll freely. The disc only has to perform the work of rotating condenser plate 62. Because of the lightness and free rotation of the parts rotating with disc 41, there is no tendency for disc 41 to slip relative to disc 37. Consequently the rotation of disc 41 is an accurate measure of the miles traversed by the ship. This force is so small, however, that it must be amplified to drive a counter and a remote indicating system.

As the condenser plate 62 is rotated, it acts through the amplifier unit 64 to energize a motor 71. This motor is mounted on the plate 33 and is connected through gearing 72 to rotate shaft 48. Consequently condenser plate 67 is rotated to tend to rebalance the system. Shaft 48 therefore rotates at the same speed as disc 41. By rotating disc 37 at the proper speed and using the proper gearing 73 between the shaft 48 and a counter 74 the counter may, in effect, multiply time by speed to give an indication of the distance traveled by the ship.

Indications of the ship's speed and distance traveled may be transferred to one or more repeater stations if desired. This may be accomplished in a number of ways, but is shown herein as being accomplished by a pair of ordinary Selsyn systems. To this end there is provided a transmitter 75 connected to the shaft 25 the rotating element of which is moved in accordance with the speed of the ship. The receiver for this transmitter is located in a repeater station 76 to move an indicating hand 77 over a suitable dial. Another transmitter 78 is mounted on the plate 33. This is driven by gearing 79 and shaft 81 from the shaft 48 so that its rotating element is moved in accordance with the distance traveled by the ship. The receiver for this transmitter is also located in the repeater station 76, and drives a counter 82 similar to counter 74.

From the above detailed description, it will be seen that I have provided continuous integrating mechanism for a ship log system, or for other uses, that is extremely accurate. The fact that the element driven in accordance with ship speed and time has no load to carry or work to perform means that there will be no slippage in its drive. The work of operating the counter is performed by a torque amplifier whose coaction with the driven element is entirely electrical.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described the invention, what I claim as new and desire to secure by Letters Patent is:

1. In an integrator, a driving disc, means to rotate said disc at a constant speed, a driven disc having its periphery in engagement with the face of said driving disc, means to mount said driven disc for rotation and for radial movement relative to said driving disc comprising a shaft mounted above and parallel to the face of said driving disc, a supporting part, means to slidably and non-rotatably mount said part on said shaft, a cylindrical member attached to said driven disc, means to rotatably mount said cylindrical member jointly on said shaft and said supporting part, means to bias said driven disc, cylindrical member and part in one direction along said shaft, means movable in proportion to the value of a condition to be integrated to move said driven disc, cylindrical member and part in the opposite direction along said shaft against the force of said biasing means, a first and a second element carried respectively by said cylindrical member and said part, means operated upon movement of said first element by said driven disc relative to said second element to rotate said shaft and thereby said second element and said part to follow the rotation of said first element, and a counter driven by said last mentioned means.

2. In an integrating device, the combination of a driving disc, means to rotate said disc at a constant speed, a shaft extending transversely to the face of said disc, a driven disc engaging the face of said driving disc and being rotated thereby, a cylinder slidably and rotatably mounted on said shaft and to which said driven disc is attached, a part slidably but non-rotatably mounted on said shaft, a first element carried by said cylinder, a second element carried by said part, a device to shift said cylinder and part along said shaft to positions corresponding to the value of a variable condition and thereby vary the speed of said driven disc, follow-up drive mechanism controlled by said elements to rotate said shaft so that said second element will remain at a fixed position with respect to said first element, and an indicator operated by said shaft.

JOHN G. BOOTH.

REFERENCES CITED

The following references are of record in the file of this patent:

UNITED STATES PATENTS

| Number | Name | Date |
|---|---|---|
| 742,216 | Nicholson | Oct. 27, 1903 |
| 1,292,085 | Schantz | Jan. 21, 1919 |
| 1,741,713 | Holmes | Dec. 31, 1929 |
| 1,838,084 | Drake | Dec. 29, 1931 |
| 1,842,160 | Ford | Jan. 19, 1932 |
| 1,968,539 | Rydberg | July 31, 1934 |
| 1,977,498 | Staegemann | Oct. 16, 1934 |
| 2,022,275 | Davis | Nov. 26, 1935 |
| 2,126,910 | Moseley | Aug. 16, 1938 |